Nov. 27, 1923.

G. W. RIDDLE

COMPOSITE STRUCTURE

Filed Aug. 28, 1920

Inventor
George W. Riddle
by Clarence E. Mehlhope
Atty.

Nov. 27, 1923.
G. W. RIDDLE
COMPOSITE STRUCTURE
Filed Aug. 28, 1920
1,475,409
2 Sheets-Sheet 2
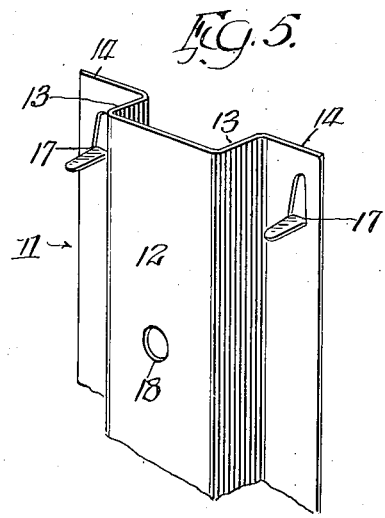
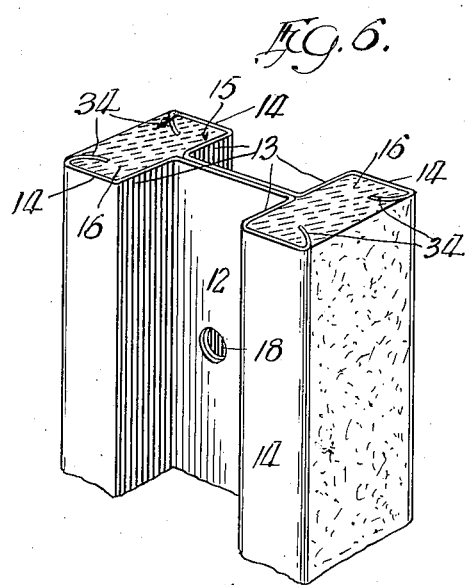
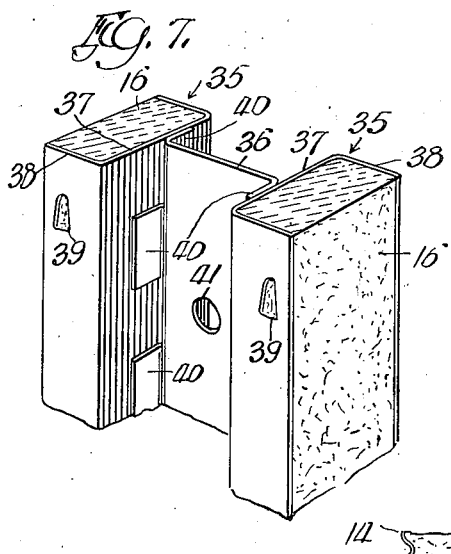
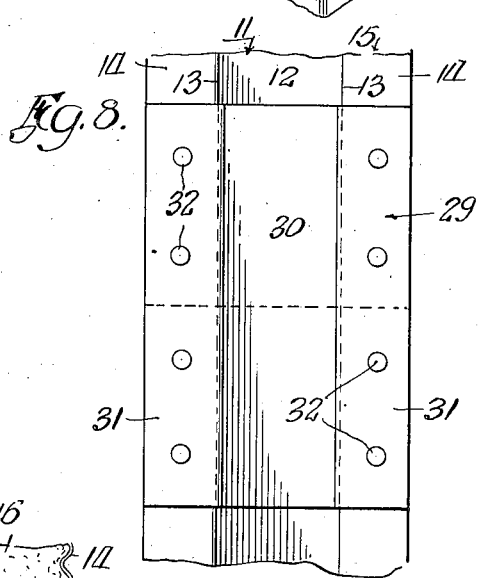
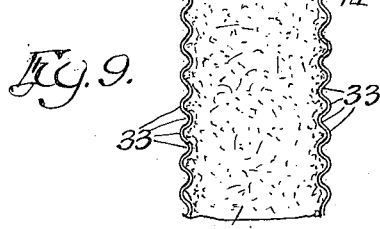
Inventor
George W. Riddle
by Clarence E. Mehlhope
Atty.

Patented Nov. 27, 1923.

1,475,409

UNITED STATES PATENT OFFICE.

GEORGE W. RIDDLE, OF CHICAGO, ILLINOIS.

COMPOSITE STRUCTURE.

Application filed August 28, 1920. Serial No. 406,602.

*To all whom it may concern:*

Be it known that I, GEORGE W. RIDDLE, a citizen of the United States, and a resident of Chicago, in the county of Cook, State of Illinois, have invented certain new and useful Improvements in Composite Structures; and I do hereby declare that the following is a full, clear, and exact description thereof, reference being had to the accompanying drawings, and to the letters of reference marked thereon, which form a part of this specification.

This invention relates to improvements in composite structures for studding and beams and consists of the matters hereinafter described and more particularly pointed out in the appended claims.

The primary object of the invention is to provide a composite structure adapted to take the place of wood frame members in building constructions, such as studding, beams and the like.

Another object of the invention is to provide a substantially light, strong and non-combustible structure which may be readily cut to size and which will securely hold nails or other fastening devices used for attaching thereto wood or metallic lath, wallboard and the like.

These objects of the invention together with others, as well as the many advantages thereof, will more fully appear as I proceed with my specification.

In the drawings:—

Fig. 5 is a detail perspective view of one of the metallic strips which goes to make up that form of structure shown in Figs. 1 to 4 inclusive;

Fig. 6 is a detail perspective view of a modified form of my improved composite structure;

Fig. 7 is a detail perspective view of another modified form of my improved composite structure;

Fig. 8 is a detail view in side elevation showing one manner of securing together the abutting ends of two aligned pieces of my improved composite structure;

Fig. 9 is a detail view in elevation of the nailing face of still another modified form of my improved composite structure.

Figures 1, 2:
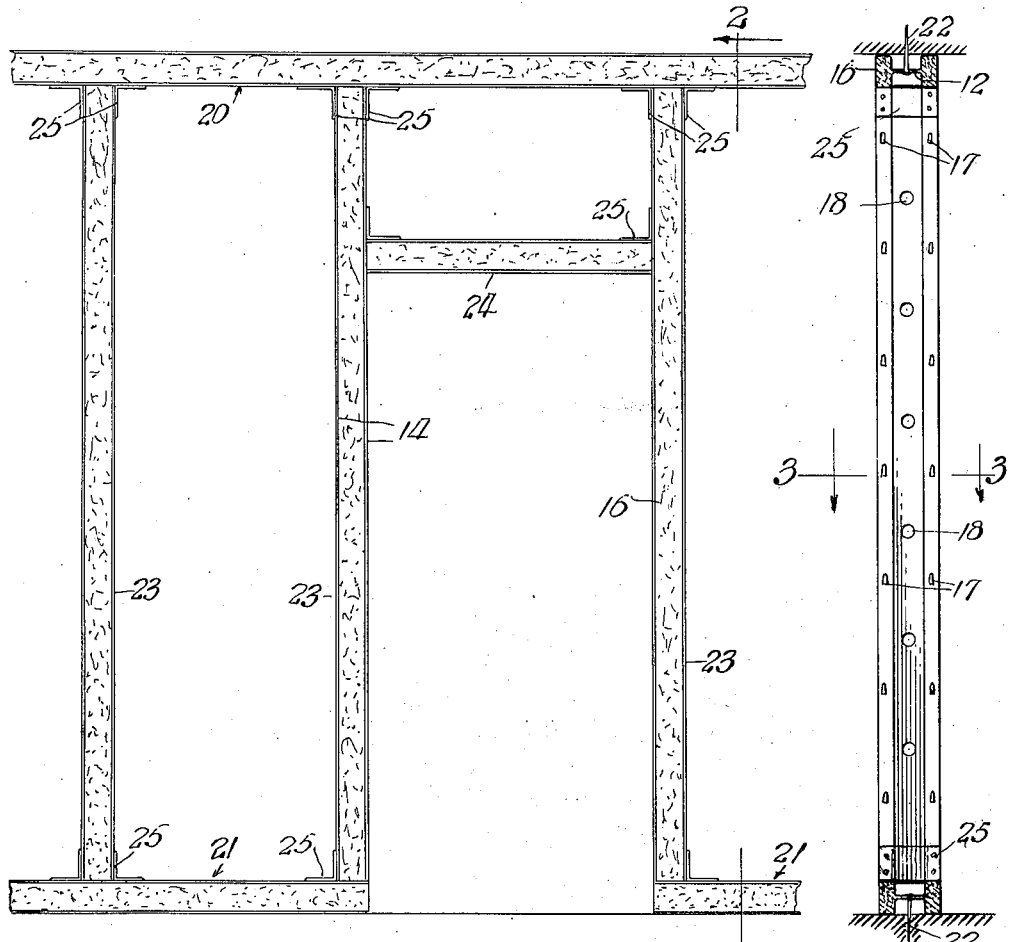
Fig. 1 is a view in side elevation of a door frame, adjacent studding and associated stringers of a building construction, made up of my improved composite structure.
Fig. 2 is a vertical section taken on the line 2—2 of Fig. 1.

In general my improved composite structure includes a metallic shell which is substantially rectangular in cross section and is formed to provide spaced oppositely facing channels at its sides, in which is secured a plaster composition, hereinafter called a nailing mixture, adapted to hold any nails driven into it.

Referring now in detail to that embodiment of the invention illustrated in Figs. 1 to 5 inclusive, of the accompanying drawings;—10 indicates a sheet metal shell which is made up of two similar thin sheet metal strips 11 (see Fig. 5) of a channel-like cross-section. The strip 11 has a comparatively wide central web 12 and right angle flanges 13 at the ends thereof which terminate in outwardly bent marginal parts 14, arranged parallel with but spaced from the central web 12. To make the shell, two of said strips 11 are placed back to back, with their central webs aligned and engaging with each other, so that the flanges 13—13 face in opposite directions, after which said webs are spot-welded or otherwise secured together. With the strips thus secured together, the flanges 13 and marginal parts 14 provide oppositely facing end channels or grooves 15 which are spaced from each other by a central web of a double thickness of metal.

Figure 3:
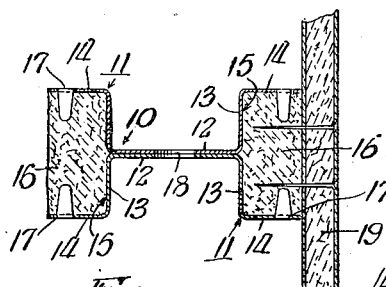
Fig. 3 is an enlarged detail cross-sectional view taken on the line 3—3 of Fig. 2.

The channels or grooves 15 are adapted to receive a nailing composition or mixture 16, into which nails may be driven and are held in the same manner as in wood. I find that re-hydrated calcined gypsum, wood fibre and an adhesive consisting of some vegetable or mineral gum or oil such as rosin or asphalt, in the proportions of approximately 75 parts of gypsum, 20 parts of wood fibre and 5 parts of adhesive, produces a mixture suitable for the purpose. The marginal parts 14 are constructed to secure the nailing mixture to the shell and to prevent its accidental displacement or falling out of the channels 15, and in the construction herein illustrated said marginal parts are punched out as at 17 to provide longitudinally spaced fingers or anchors, which extend inwardly of the channels 15. When the nailing mixture hardens and dries out, an efficient bond is provided between the shell and the nailing mixture. In the webs 12 are provided longitudinally spaced, registering holes 18 for the passage of electric conductors or tubes through the same, when the improved composite structure is used as studding or beams in building constructions. In Fig. 3 I have illustrated a piece of wall board 19 secured to the studding by nails driven through said wall board and into the nailing mixture 16 in one of the channels 15.

In Fig. 1 I have illustrated my improved composite structure as embodied in the frame-work of a doorway. In this instance 20—21 indicate the ceiling and floor stringers which are secured in place by nails 22, and 23 indicates the upright studding. 24 indicates a transom sill between two of the studding 23 to provide the doorway.

Figure 4:
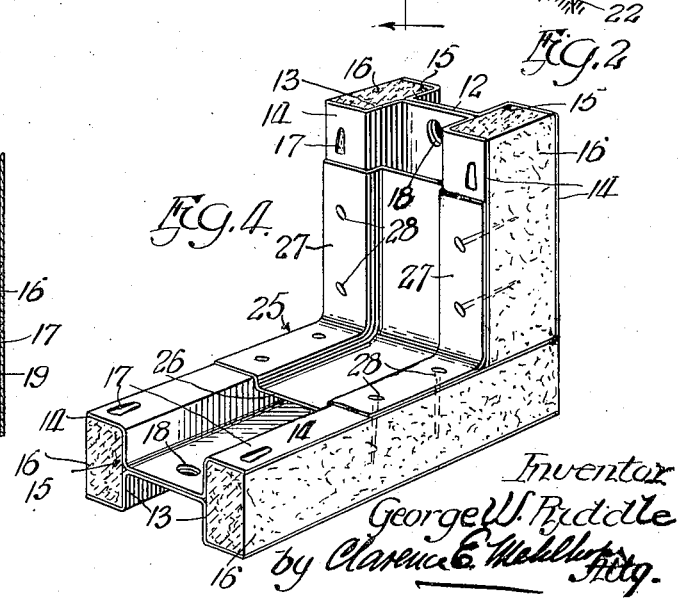
Fig. 4 is a detail perspective view showing the manner of securing together two pieces of my improved structure, arranged at a right angle to each other.

The upright studding 23 engage at their ends with said ceiling and floor stringers and are secured thereto by means of corner clips or plates 25 (see Figs. 1 and 4). Each clip or plate is made in the form of an angle-bar which has a central depressed rib 26 that fits between the channels 15 and lateral flanges 27 which engage upon the marginal parts 14 of the shell and are secured thereto by nails 28 driven through said flanges 27 and said marginal parts 14 and into the nailing mixture 16 in said channels.

In Fig. 8 I have illustrated a means for connecting the abutting ends of the aligned lengths of my improved composite structure. Said means comprise in this instance channel like plates 29, one placed on each side of the studding so as to lap or overhang the abutting ends thereof. Each plate has a central depressed rib 30 which fits between the channel 15 and lateral flanges 31 which engages against the flanges 14 and are secured thereto by nails 32 driven through the flanges of the clips and marginal parts 14 of the shell and into the nailing mixture within the channels 15.

Should it be desired to stiffen the marginal parts 14 of the shell without increasing the thickness of the metal thereof, this may be done by crimping said parts transversely to provide corrugations 33 as shown in Fig. 9.

In Fig. 6 I have shown a modified form of construction for holding the nailing mixture 16 within the channels 15. In thus instance the marginal parts 14 are made of a greater width and are then bent inwardly of the channels to provide longitudinally extending lips 34 which are embedded in said nailing mixture. This construction is also advantageous in that it provides rounded corners for the structure and strengthens the same to counteract any tendency of the spreading of said marginal parts 14 under pressure imparted to the ends of said structure in its use.

In Fig. 7 I have illustrated another modified form of construction which comprises oppositely facing channels 35—35 that are spaced apart by a web 36 of a single thickness of metal. Each channel has a web 37 and side flanges 38 in each of which are provided the fingers or anchors 39 for holding the nailing mixture 16, as shown in Figs. 1 to 5 and before described. The web 36 has its margins cut to provide oppositely facing, staggered ears 40 which are connected in any suitable manner to the webs 37 of the channels 35. Holes 41 are provided in said web for the passage of the current conductors used in the building.

My improved composite structure has many advantages. It may be easily cut and joined and is therefore a ready substitute for wooden studding and beams. It is absolutely non-combustible and readily grips and holds the nails driven into it. Interior building trim may be nailed to it in the same manner as trim is now applied and this without the necessity of drilling any holes in it. Electric wire and pipes may all be enclosed in a wall wherein my improved structure is used. It possesses a great tensile strength and will not buckle or bend under the ordinary working load for which the structure is intended.

While in describing my invention I have referred to certain details of mechanical construction, form and arrangement of parts, I do not wish to be limited thereto except as is pointed out in the appended claims.

I claim as my invention:—

1. A composite structure of the kind described, comprising a thin sheet material shell providing two oppositely facing channels which are connected together by a web, a nailing mixture in said channels, and means formed from and integral with said channels and extending into said nailing mixture for locking the same in said channels.

2. A composite structure of the kind described comprising, a thin sheet metal shell providing two oppositely facing channels which are connected together by a web, said web having openings for the passage of conduits therethrough, and a nailing mixture secured in said channels, by parts of said channels bent inwardly to extend into the nailing mixture.

3. A composite structure of the kind described, comprising a shell made of two like, thin sheet metal strips which are secured together along their median line and are constructed to provide two oppositely facing channels and an intermediate connecting web, a nailing mixture in said channels, and means formed from and integral with said channels and extending into the nailing mixture for locking the same in said channels.

4. In a composite structure of the kind described, a shell made of two strips of thin sheet metal each strip having a central apertured web and rightangle flanges at the ends thereof which terminate in outwardly extending flanges spaced from and parallel with the central web, said outwardly extending flanges including parts bent inwardly thereof toward the plane of said central web.

In testimony that I claim the foregoing as my invention, I affix my signature in the presence of two witnesses, this 25th day of August, A. D. 1920.

GEORGE W. RIDDLE.

Witnesses:
F. A. WIEGMAN,
T. H. ALFREDS.